INVENTORS
RUDOLF FAUDE
WILLI HALLER
BY HEINZ HENGSTLER

OSTROLENK, FABER, GERB & SOFFEN
ATTORNEYS

INVENTORS
RUDOLF FAUDE
WILLI HALLER
HEINZ HENGSTLER
BY
OSTROLENK, FABER, GERB & SOFFEN
ATTORNEYS

# United States Patent Office 3,436,530
Patented Apr. 1, 1969

3,436,530
CONTROL DEVICE
Rudolf Faude, Fort Lee, Willi Haller, Teaneck, and Heinz Hengstler, Englewood, N.J., assignors, by mesne assignments, to Hecon Corporation, New Shrewsbury, N.J., a corporation of New Jersey
Filed Feb. 17, 1966, Ser. No. 537,597
Int. Cl. G06c 29/00
U.S. Cl. 235—92                           22 Claims

ABSTRACT OF THE DISCLOSURE

A control device for preventing unauthorized use of a machine and further for expediting cost accounting procedures by allocating cost to departments. The control device is coupled between the lower power source normally employed for energizing the machine and has its output coupled to the machine. The machine is prevented from being energized until an electronic key device is plugged into the control device. The control device is provided with a counter for counting the total number of intervals of time or the other productivity units of the machine. A variety of departments may be provided with an electronic counter device for insertion into the control device. Each of these units is provided with its own separate counter for counting those productivity units which that particular department has used. The control device may be provided with a virtually non-defeatable circuit which necessitates the provision of a compatible circuit component within the electronic key device which permits operation of the control device to couple energy from the local power source to the machine being controlled thereby. A cross check on the total number of productivity units allocated to or used by each department may be obtained by comparing the count in each such electronic key device against the counter provided in the control device.

---

The instant invention relates to control devices, and more particularly to a novel control device comprised of a counter means and an electronic interlock circuit which is designed to operate as a "key" for gaining authorized access to a piece of electronic or mechanical equipment, as well as for keeping a cumulative record of the amount of access time or the amount of items produced by the electronic equipment during the period in which an operator exercises such authorized access.

There are many devices which exist in business and industry today wherein it is desired to permit access to such machines only to those persons having proper authorization. For example, in the case of copier machines which may be utilized by a company, it is most economically desirable to prevent use of the copier for personal or non-business reasons in order to exert appropriate economic control over the use of the machine. Present-day copier machines are typically provided with a counter which is substantailly tamper-proof for keeping a cumulative count of the total number of copies run off by the machine. Such machines are typically leased, and the owner of the machine usually reads the machine counter once a month to establish the cost of the machine for that month to the company renting the machine. In order to exert appropriate control over the machines and in an atempt to prevent personal or other unauthorized use of the machine, it is conventional to provide persons authorized to use the machines with a key to unlock and enable the normally disabled and locked machine in order to permit its use for producing copies. Unfortunately, however, it is a rather simple matter to obtain such a key and to make duplicate keys at an expense of well under $1.00 per duplicate, thereby making it extremely economical for someone desiring to use the machine for unauthorized purposes to obtain such a duplirate key in order to use the copier machine. It is thereby most important to provide a tamper-proof lock means which is effectively impossible to defeat and relatively expensive to duplicate in order to put the copier machine to an unauthorized use.

Another objective which many employers renting such machines would like to achieve is that of being able to accurately allocate costs for the rental of such machines to the numerous departments sharing use of the machine. For example, one or two machines may be provided on any given floor of a building, which floor may house two, three or some greater number of different departments, all of which share in the use of the one or two machines. Since such machines are normally provided with only a single counter, there is no simple, accurate way for determining the number of copies which have been run off by the personnel of any given department using the copier machine. One typical way of allocating costs is by stationing one employee on a full-time basis at each copier machine, whose duty it is to keep a count of the number of copies run off by each department by inquiring of each user what department he or she is assigned to and the total number of copies which the party is running off. This is a rather tedious job and requires a full-time employee for each machine, thus making it an extremely expensive method of obtaining cost control information.

In an effort to provide both an inexpensive way of obtaining cost control data as well as preventing unauthorized use of a copier machine, we conceived of the idea of employing an individual counter which may be readily and simply plugged into a mating socket in a copier machine, and which includes an electronic interlock or "key" means which serves the dual function of providing a count of the number of copies run off on the copier machine, and provides for enablement of the copier machine to permit its use by assigning such a "key-counter" to each department, whereby cost control data is immediately available. The copier machine still retains its own counter so as not in any way to affect the machine count and thereby inhibit the reading of the copier machine counter by agents of the company owning and renting such machines. Either the company renting the machine or the company owning the machines, or both, may perform a safety check against the possibility of any tampering with the machine by adding up the counts on each individual key-counter and comparing this sum with the count on the machine counter. The fact that these counts are identical indicates that there has been no tampering with the machine and that all of the equipment is operating properly. Any deviation from an exact comparison provides an immediate indication that either the machine equipment should be checked, or that someone has been tampering with the machine, or with one or more of the key-counters.

The instant invention is basically comprised of an electromechanical counter which is capable of generating a cumulative decimal count of any number of decimal digits, preferably six decimal digits so as to permit a total cumulative count of 1,000,000. The electromechanical counter is provided with suitable relay means pulsed by the copier machine each time a copy is run off to increase the count of the counter by 1. It should be understood that the device of the instant invention is not limited in its application to copier machines, but may be employed to obtain access to computers, machine tools, and other devices to measure productivity. The counter relay may be a device which is energized by either a constant A-C or D-C signal from the computer and which generates a time rate to provide a counter on the counter which indicates elapsed time during which an authorized employee has exercised access over the computer. Removal of the key-counter from the computer (or copier machine) automatically terminates the counting process and deenergizes the computer (or copier machine).

The key-counter is further comprised of a substantially sealed housing which is not capable of being opened by unauthorized persons, and which is provided with a plurality of prongs or pins located in a predetermined physical array, and which are thereby keyed to be received by associated openings in a socket provided in the copier machine, or other machine being so controlled.

The key-counter is designed to electrically energize the machine and establish electrical connection between the key-counter and the pulsing source of the copier machine. The copier (or other) machine is provided with relay means compatible with the key-counter and which is normally deenergized so as to maintain a relay control switch in the normally open position to prevent the copier machine from being energized, hence operated. Since the coupling of the relay to the local energy source may constitute simply a bridging circuit, i.e., a direct shunt, it would be a substantially simple matter to defeat the locking means simply by bridging the appropriate openings in the machine socket by a wire or other suitable type of conductor to energize the relay. In order to prevent the locking means from being defeated in such a simple manner, the relay means of the copier machine is preferably comprised of a relay device having first and second windings which are so wound as to have their magnetic fields in opposition to one another. The relay operates a contact switch which is normally in the released position when the copier machine locking device is deenergized. When the copier machine locking device is coupled to a local power source, one of the copier machine relay windings is energized, causing its contact switch to be moved to the OPERATE position. In this position, the switch is so wired as to disconnect power from the copier machine and thereby inhibit its operation. By insertion of the key-counter device into its appropriate socket, a bridging circuit is established between the local power source and the remaining winding of the copier machine relay to substantially exactly counterbalance the field of the first winding and thereby operate the switch contact to its release position which is wired to energize the copier machine and thereby permit its use. In order to balance the windings, the bridging circuit contained within the key-counter is provided with an impedance element which limits the current in the second winding so that the resultant ampere-turns of the second winding exactly balance the ampere-turns developed by the first winding. In order to defeat such a device, an impedance measurement must be made across the correct pins of the key-counter device and an element of a substantially exact impedance value must be bridged across the appropriate socket openings of the copier machine in order to defeat the machine lock and thereby permit unauthorized use of the machine. It is extremely difficult to determine which two pins the impedance reading should be taken across, and hence which is the appropriate impedance value, thus making the machine locking means more difficult to defeat.

In order to provide a locking device which is substantially impossible to defeat, the impedance device employed is preferably one which has a characteristic of changing impedance with temperature; for example, a resistor having a resistance which varies in accordance with a negative temperature coefficient characteristic. In an attempt to establish this impedance, it thereby becomes necessary to vary the current across the element to determine its characteristic curve in order to establish its resistive value which will operate the copier machine lock. Even assuming that the characteristic can be determined, it is virtually impossible to determine the magnitude of current that will be passed through the bridging circuit, except by providing an element of the exact characteristic, thereby making it virtually impossible to defeat the machine electronic lock.

As alternative preferred embodiments, the electronic "key" may take other forms such as, for example, a logical circuit which is not capable of being identified simply by taking a resistance measurement. The electronic circuit of the key-counter may, for example, be a logical circuit which may be constructed in printed circuit or integrated circuit form so as to be very small and compact, and which is employed for the purpose of providing a complementary match to a logical circuit contained within the copier machine, and which requires the complementary circuit to be plugged in before the copier machine can be unlocked and hence operated.

The key-counter thus provides the function of maintaining a count for each individual department owning such a key-counter to simply and accurately determine their cost control data, to provide a sophisticated means for permitting authorized use of the machine, and which is not capable of being either simply or cheaply duplicated, so as to permit defeat of the machine electronic lock in order to permit any unauthorized use. It further provides additional flexibility of permitting as many departments to use a single machine as may be desired simply by providing each department with its own key-counter.

It is, therefore, one object of the instant invention to provide a novel electronic means for exercising control over a normally locked device by authorized personnel.

Another object of the instant invention is to provide a novel electronic circuit for inhibiting operation of a machine until a particular electronic key is appropriately inserted into the device.

Another object of the instant invention is to provide a novel key-counter device which is comprised of means for establishing a count of elapsed time or a pulse count, and which is combined with electronic key means to permit authorized use of the device controlled by the electronic key-counter.

Another object of the instant invention is to provide an electronic means normally adapted to prevent operation of a machine until an electric key-counter is plugged into said device which electronically unlocks the control device and further receives a signal from the machine being controlled to keep a count of the elapsed time the machine is in use or the number of items produced by said machine.

Another object of the instant invention is to provide a novel locking device for copier machines, computers, machine tools, flow computers, and the like, comprised of electronic means normally adapted to prevent operation of the machine until a key-counter is plugged into the control device to appropriately establish the electrical circuit which enables operation of the machine, and which is further comprised of counter means pulsed by the machine to maintain a count of the number of items produced by the machine or the elapsed time of operation of the mahcine.

These and other objects of the instant invention will become apparent when reading the accompanying description and drawings in which:

FIGURES 5a and 5b show alternative embodiments for the interlock of FIGURES 3b and 4a.

Figures 1A, 1B, 2, 3A:
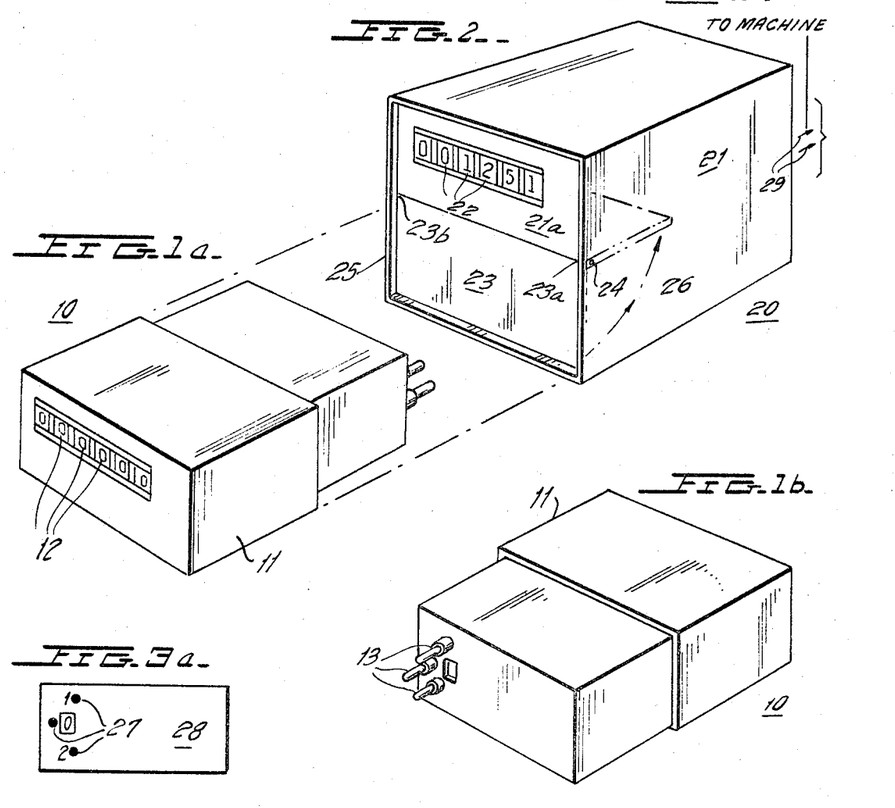
FIGURES 1a and 1b are perspective views showing the front and rear views of a key-counter designed in accordance with the principles of the instant invention.
FIGURE 2 is a perspective view of the control device adapted for receiving the key-counter of FIGURES 1a and 1b with FIGURE 1a showing the manner in which the key-counter is inserted into the control device of FIGURE 2.
FIGURE 3a shows a view of the pinholes provided in the control device socket of the control device of FIGURE 2.

Referring now to the drawings, FIGURES 1a through 2 show a counter 10, designed in accordance with the principles of the instant invention, and which is comprised of a substantially completely sealed housing 11 provided with a plurality of individual windows 12, behind which are stationed the individual number wheels of an electromechanical counter. The electromechanical counter may, for example, be a type F043 counter, manufactured by Hengstler Numerics, the assignee of the instant invention, as described in the Hecon Counter Catalog, published Feb. 1, 1965. However, any other suitable counter may be employed. It is sufficient to understand that the counter is advanced by a relay means and performs a totalizing function. The cumulative count may be read simply by observing the decimal numerals appearing behind the windows 12 which, in the preferred embodiment, has a capability of counting from 000,000 to 999,999. Housing 11, in addition to containing the counter and its stepping relay, also houses the necessary electronic interlock means for permitting operation of the control device 20, shown best in FIGURE 2.

The control device 20 is comprised of a housing 21 which is provided with a plurality of windows 22 along its front face 21a, behind which is mounted a second or master counter means having its character wheels positioned behind an associated window 22. The master counter of control device 20 is basically of the same type as is housed in counter device 10 and is provided with its own stepping or advancing relay to advance the count in the counter which operates as a totalizing device. Master counter may be omitted, if desired, under certain applications.

The control device is further provided with a hinged front cover 23 which is pivoted at its upper ends 23a and 23b to the side walls of control device 20 by a suitable pivot pin, one end of which is shown at 24. The hinged cover plate 23 substantially seals opening 25 having a configuration of the perimeter of the cover plate 23 which is substantially of the same shape as the key-counter device 10, but which is slightly larger in dimension so as to readily and simply receive the key-counter device within the opening.

FIGURE 2 shows the control device 20 with the key-counter being removed. In order to insert the key-counter 10 into control device 20, the key-counter is inserted with its pin end into the opening 25, causing the cover plate 23 to pivot about pin 24 and move from its vertical position, shown in FIGURE 2, to the horizontal position 231, shown in dotted fashion, moving in the direction shown by arrow 26 of FIGURE 2. As can be seen from FIGURE 1b, the rear end of key-counter 10 is provided with a plurality of conductive pins 13 which are arranged in a predetermined planar array so as to be received by similarly arranged associated holes, or openings, 27 contained within an interior wall 28 provided within control device 20, which is spaced inwardly from opening 25. The interior wall sockets are best shown in FIGURE 3a.

The control device 20 is electrically coupled through suitable leads 29 to a copier machine, computer, and the like, to provide the functions of inhibiting use of the machine until a key-counter device 10, having the proper interlock circuitry, is inserted within control device 20, further providing the function of keeping a cumulative count by means of the control device counter, while at the same time providing a signal to advance the counter of the key-counter structure 10. The control device 20 may, for example, be attached to a copier machine to maintain a cumulative count in its totalizing counter which reflects the total number of copies run off by the copier machine. Each individual key-counter 10 may be assigned to a specific department and, when inserted into control device 20, is caused to develop its own count reflecting the total number of copies attributed to the particular department having possession of an associated key-counter.

Figure 3B:
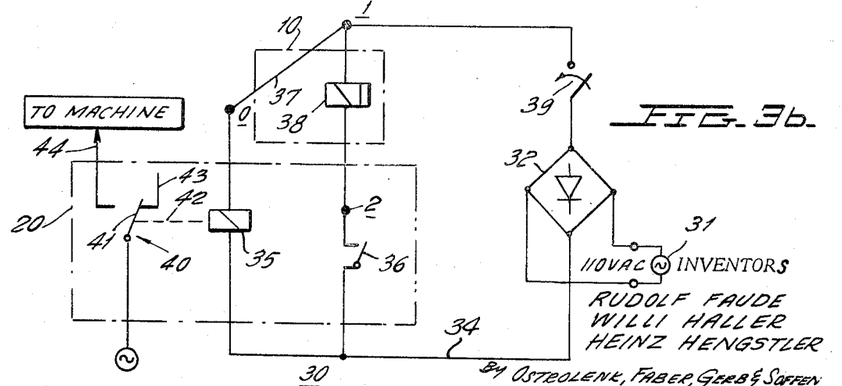
FIGURE 3b is a circuit diagram showing the electrical circuit of the control device of FIGURES 2a and 2b and the electrical circuit of the key-counter device of FIGURES 1a and 1b.

FIGURE 3b shows the electrical circuit of one preferred embodiment of the instant invention. The dotted rectangle 10 represents the electronic circuit provided within key-counter device 10, while the dotted rectangle 20 represents the electrical circuit provided within control device 20. The circuitry 30 of FIGURE 3b is comprised of an alternating current source 31 which may, for example, be a 110 volt A-C source which is coupled across two terminals of a diode bridge 32. The remaining two terminals of diode bridge 32 are coupled to conductors 33 and 34. Diode bridge 32 acts to full-wave rectify the A-C signal produced by source 31. Conductor 33 is coupled to the socket $\underline{1}$, while conductor 34 is coupled in common to both one terminal of relay 35 and one terminal of a pulsing source 36. Key counter device 10 is provided with a shunting or bridge conductor 37 and a counter advancing coil 38. The shunt conductor 37 is coupled between the pins $\underline{0}$ and $\underline{1}$, while the terminals of counter coil 38 are coupled between the pins $\underline{1}$ and $\underline{2}$.

The device is operated by moving a switch 39 to the closed position, thus coupling D-C (i.e., full-wave rectified A-C) power to the circuit. Before powering the circuit, it should be noted that relay 35 has its armature mechanically coupled to the movable arm 41 of a contact switch arrangement 40, the coupling being represented by the dotted line 42. When deenergized, suitable bias means (not shown) acts to maintain movable arm 41 into engagement with contact 43. Closure of switch 39, however, fails to provide any power to relay 35 due to the open circuit between points $\underline{0}$ and $\underline{1}$. By insertion of the key-counter device 10 into the control device 20 in the manner shown in FIGURE 2b, and with the conductive pins 13 of key-counter 10 being received by the sockets 27 of control device 20, an electrical path is established between terminals $\underline{0}$ and $\underline{1}$ by the bridging conductor 37 and an electrical path is established between circuit points $\underline{1}$ and $\underline{2}$ by the counter coil 38. The insertion of key-counter 10 thereby couples relay 35 to the energy source causing it to operate movable contact 41 out of engagement with stationary contact 43 and into engagement with stationary contact 44 so as to couple a power source 45 to the machine which is placed under control of the control device 20.

Use of the control device 20 and key-counter 10 in this manner completely avoids the need for a separate OFF-ON switch of the machine. For example, when coupled to a copier machine, insertion of the key-counter 10 may automatically operate as the device for turning the machine on. The switch 39 is not needed and may be omitted if desired.

As each copy is run off by the copier machine, suitable means are provided for closing the pulsing switch 36, as shown, or may be any other suitable mechanical or electromechanical or electrical device sufficient to provide a pulse for operating counter coil 38 in order to develop a count within the key-counter 10. The counter of the copier machine may be any conventional counter device and has been omitted here for the sake of brevity.

FIGURE 3b shows a simplified key-counter device which may be employed with the control device 20. The structure may be defeated by bridging a conductor across terminals 0 and 1, which can be accomplished by inserting a conductor into the appropriate sockets 27 in the rear wall 28 of control device 20. This would permit unauthorized personnel to defeat the locking function performed by the control device in a rather simple manner.

Figure 4:
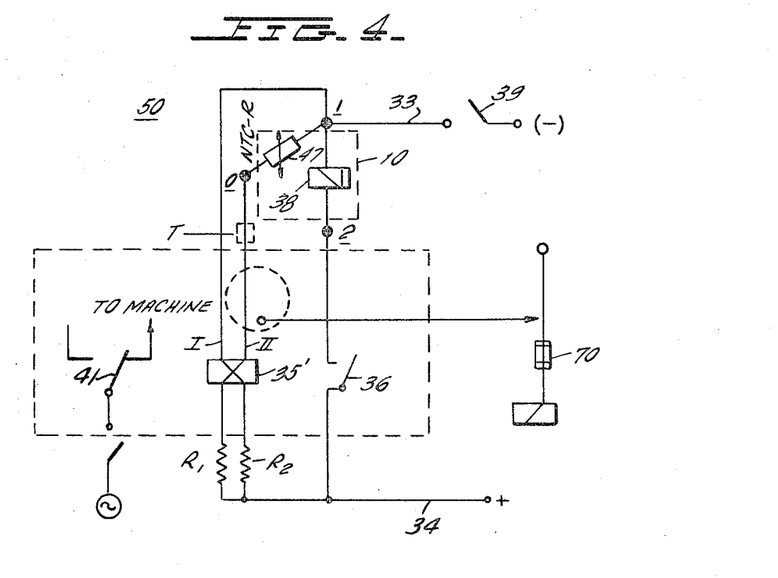
FIGURE 4 is a schematic diagram of an alternative embodiment of the instant invention.

In order to provide a locking arrangement which is virtually impossible to defeat, the electrical arrangement of FIGURE 4 may be employed. In the embodiment 50, the control device 20 differs from that shown in FIGURE 3b in that it is comprised of a relay structure 35' having independent relay windings I and II, respectively. Winding I is coupled between socket 1 and the conductor 34. Winding II is connected between conductor 34 and socket 0. The windings are so arranged that the ampere-turn NI of the two windings counterbalance one another to prevent operation of the movable arm 41 of switch structure 40.

The key-counter 10 electronics differs from that shown in FIGURE 3b in that a variable impedance device 47 has been substituted for the shunt conductor 37 of FIGURE 3b. Power source 31, diode bridge 32 and switch 39, as shown in FIGURE 3b, have been omitted from FIGURE 4 only for purposes of brevity, it being understood that the same structure or an equivalent thereof may be employed for powering the circuit 50.

Figure 4A:
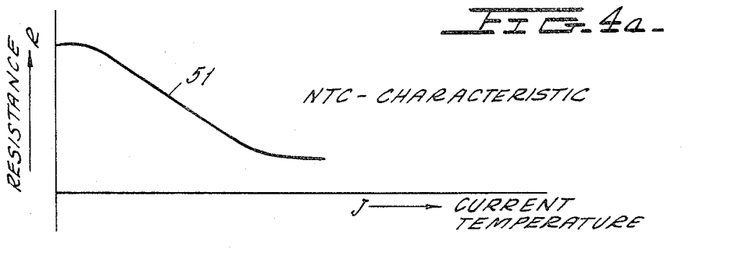
FIGURES 4a and 4b are plots showing the resistance characteristics of the interlock device employed in the circuit of FIGURE 4 and the hold, release and operate levels for the circuit of FIGURE 4, respectively.

FIGURE 4a is a plot showing a negative temperature characteristic curve for one nonlinear impedance device which may be employed for use as element 47. The curve 51 of FIGURE 4a shows the manner in which the resistance of the device decreases with increasing current. It should be understood that the resistance is a function of temperature which is related to current substantially by a constant of proportionality. Thus, as current increases, the resistivity of the device diminishes following the curve 51.

No power is applied to the circuit 50 of FIGURE 4. Coils I and II, having no current, are incapable of operating movable arm 41, and hence its normal biasing means (not shown, but which may be a spring means) maintains the movable arm 41 in the position shown in FIGURE 4.

As shown in FIGURE 4, with movable arm 41 in its right-hand position, power source 45 will be coupled to the terminal 43 which is, in turn, coupled to the machine, i.e., the copier machine, for example. This condition is prevented by providing a second switch 39' in this power circuit which is ganged with switch 39 so that when switch 39 is in the open position, switch 39' is open, and likewise when switch 39 is closed, switch 39' also closes. Thus, no power is supplied to either of the windings I and II of relay 35', and movable arm 41 will be maintained in the position shown in FIGURE 4. This condition is represented by state A, shown in the diagram of FIGURE 4c.

Resistors $R_1$ and $R_2$ are provided in the relay coil circuits I and II in order to provide further means for limiting the current flow through these branches. If for any reason a change is required in the number of windings of either of the relay coils I, II, or both, the resistors $R_1$ and $R_2$ may be selected in order to provide the desired number of ampere turns to provide the counter balancing feature. Resistors $R_1$ and $R_2$ may be made adjustable, if desired.

Figure 4B:
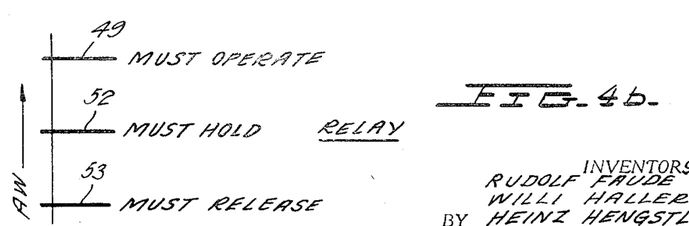
Figure 4C:
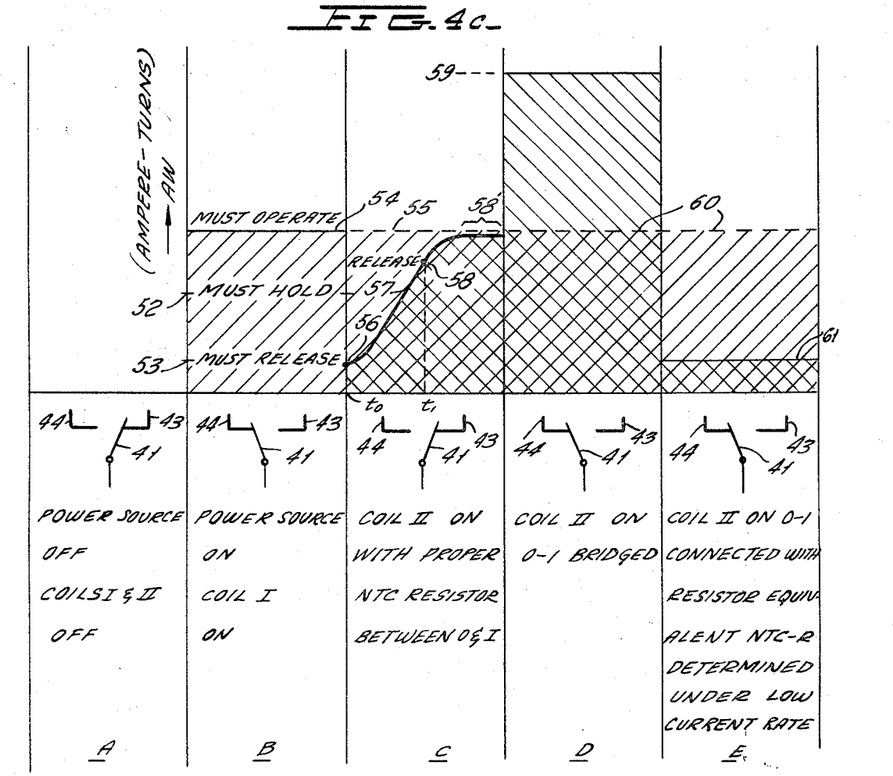
FIGURE 4c is a plot showing different operating states of the circuit of FIGURE 4 and which aid in the explanation of the operation of the circuit.

FIGURE 4b represents the characteristics of each winding of the two-winding relay. For example, considering winding I (it being understood that winding II has substantially identical characteristics), if the ampere-turns is below level 49, the electromagnetic force is insufficient to operate movable switch 41 away from the position shown in FIGURE 4. If the ampere-turns reaches or surpasses level 49, the relay will operate moving arm 41 out of engagement with contact 43 and into engagement with contact 44. Once having come into engagement with contact 44, movable arm 41 may be held into engagement so long as the ampere-turns is at least equal to the level 51. If the ampere-turns is reduced to a magnitude, as shown by level 53, movable contact 41 will be released from stationary contact 44 and will return to engagement with stationary contact 43. It should be understood that FIGURE 4b represents the total-ampere turn condition which may exist regardless of whether one, the other, or both of the windings I and II are energized.

Considering now the operation of the circuitry 50 of FIGURE 4, let it now be assumed that switch 39 is closed. This also closes switch 39', which is mechanically coupled thereto. This establishes a current path through conductor 33 and winding I to conductor 34 with the key-counter 10 removed from control device 20. This is the only electrical path established at this time. Energization of winding I produces ampere-turns of the level shown by the shaded region for state B of FIGURE 4c. The ampere-turns is, therefore, of sufficient magnitude to operate the relay causing movable contact 41 to be released from stationary contact 43 and to make engagement with stationary contact 44. Thus, there is no current path between power source 45 and the machine controlled by circuit 50.

Let it now be assumed that key-counter 10 is appropriately inserted into control device 20. This places counter relay 38 in electrical series with pulsing source 36, and places the negative temperature coefficient impedance element 47 in electrical series with relay winding II. The amount of current in this second path determines the temperature of negative temperature coefficient element 47 to establish its resistance in accordance with the relationship shown by curve 51 of FIGURE 4a. The current through winding II, coupled with the number of turns of winding II, acts to substantially balance the ampere-turns as between the two windings so as to provide a resultant magnetic field which is extremely close to zero magnitude. This can best be seen by state C of FIGURE 4c. At time $t_0$ with switches 39 and 39' closed, winding I develops ampere-turns of a magnitude represented by the diagonal hatch area 55 which is sufficient to operate relay winding I. The resistivity of the negative temperature coefficient resistance element 47 is substantially high when first inserted into the circuit as the inrush current enters the element causing its ampere turns to be of a value represented by point 56 in FIGURE 4c. As current passes through element 47, its resistance gradually decreases in accordance with curve 51 of FIGURE 4a, causing the ampere-turns developed by winding II to increase along curve 57 until, at point 58, the difference between the ampere-turns developed by winding I and the ampere-turns developed by winding II is equal to the release value 53, shown also in FIGURE 4b, causing movable arm 41 to be released from stationary contact 44 and to engage stationary contact 43. This electrically couples power 45 to the machine being controlled by circuit 50. The resistance of element 47 continues to decrease until it tapers off to a substantially constant value, as shown by portion 58' of curve 58, which value establishes an ampere-turns value which is substantially equal and opposite to the ampere-turns developed by winding I, which can clearly be seen to be well below the release level 53. This operation occurs within a time duration $t_1-t_0$. In order to further sophisticate the electronic "lock," a timing device may be provided which automatically shuts the machine down if the release level is not reached within the appropriate time duration so as to insure the fact that a negative temperature coefficient element of appropriate reaction time is being inserted into control device 20.

Let is be assumed that an attempt is made to defeat the electronic locking function by bridging a shunt circuit across sockets 0 and 1. This constitutes a path of substantially zero resistance, causing the ampere-turns of winding II to reach level 59. This level is counterbalanced by the ampere turns developed by winding I, causing the resultant ampere-turn level 60 which is sufficient to operate movable arm 41 out of engagement with contact 43 and into engagement with contact 44, thereby removing power source 45 from the machine being conrolled by circuit 50. Thus, it can clearly be seen that simply by bridging socket 0 and 1, this will not defeat the electronic locking function.

Let it be assumed that an effort is made to establish the resistance value of the negative temperaure coefficient resistance element 47 by taking a resistance measurement across the appropriate pins 13 of key counter device 10. Using a typical ohm-meter to make such a measurement will not yield the desired result, since meters of this type are extremely low current devices. At low current, the resistance of element 47 is very high. If a resistance of this value is selected on the basis of such a measurement and bridged across sockets 0 and 1, the ampere-turns will reach level 61, shown by state E of FIGURE 4c, with the ampere-turns level 60 of winding I being reduced by the amount represented by level 61. Contact 41 will still be maintained in engagement with contact 44 because the resultant level is well above the hold level 52, shown in both FIGURES 4b and 4c, so that release of the movable contact 41 cannot be obtained in this manner.

In order to defeat the electronic locking device of FIGURE 4, it would thereby become necessary to attempt to determine the resistance of element 47 by varying the current driven through this element which is an extremely difficult operation to perform, and would certainly not be obvious to anyone making an effort to defeat the electronic locking device, as the contents of the key-counter 10 are completely sealed within housing 11 and are preferably potted with a suitable potting material so that any effort to examine the contents of key-counter 10 will involve destruction of the counter device.

In addition, the laboratory set-up needed for such tests would certainly not be worth the effort of a party attempting to defeat the electronic locking device, since the major applications of the key-counter structure would not result in any monetary gain for the party who might be successful in defeating the locking device. Thus, as a practical matter, it becomes effectively impossible to defeat the control device locking means.

Figure 5A:
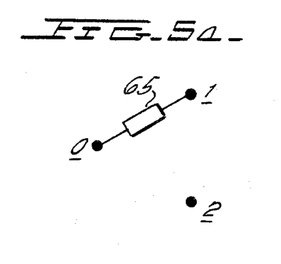
Figure 5B:
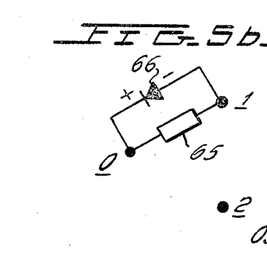

FIGURES 5a and 5b show alternative electronic means which may be employed in the key-counter 10 to permit unlocking of the control device. For example, in FIGURE 5a, the key-counter may be provided with a simple resistive element 65 which is inserted between sockets 0 and 1 in the circuit of FIGURE 4. With power off, the condition of contact 41 is shown by state A of FIGURE 5c. In this state, neither coils I nor II are energized. With power turned on, this is represented by state B of FIGURE 5c. Only winding I is energized, developing ampere-turns of level 60, causing movable arm 41 to operate to the position of state B.

Figure 5C:
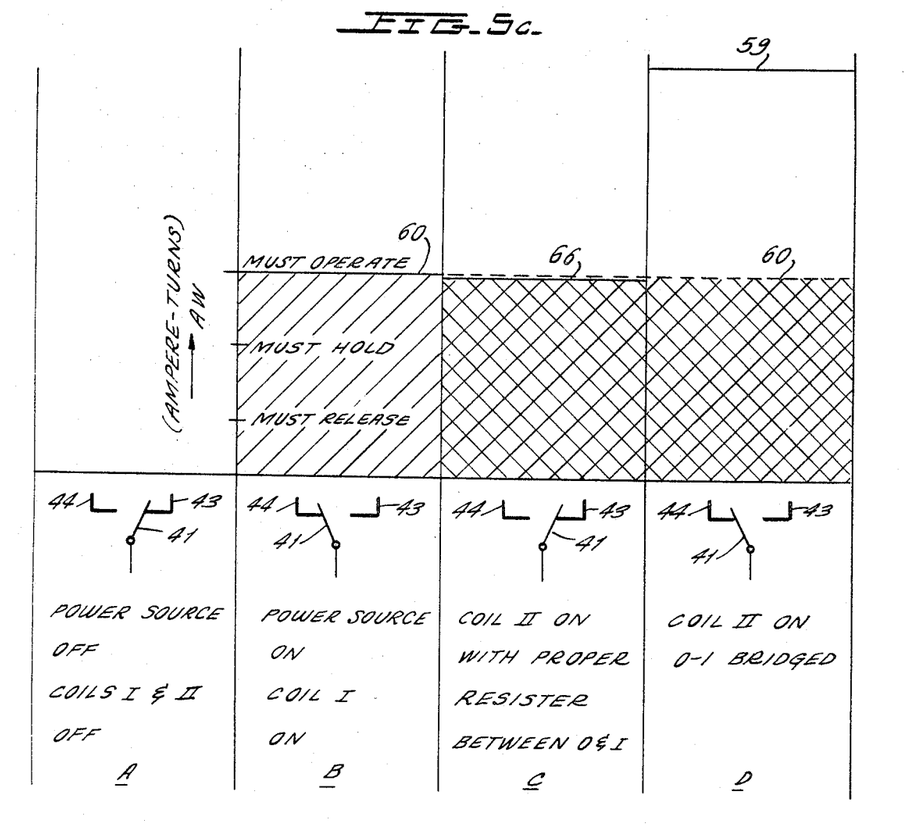
FIGURE 5c is a plot useful in explaining the operation of the interlock circuits of FIGURES 5a and 5b.

Through insertion of the resistance element 65, the winding II also becomes energized, developing an ampere-turn level 66 which is substantially equal to ampere-turn level 60, developed by winding I. The resultant ampere-turns is substantially zero, causing movable arm 41 to be released and to occupy the position shown by state C.

If an effort is made to bridge sockets 0 and 1 by a conductor (i.e., of zero resistance), the ampere-turns developed by winding II reaches level 59. This is counterbalanced by the ampere-turn level 60 of winding I. However, the resultant ampere-turn level 60 is still sufficient to operate movable arm 41 to the position shown by state D of FIGURE 5c. This arrangement is less sophisticated than the negative temperature coefficient element 47 of FIGURE 4, but nevertheless may be a sufficient measure of protection, depending upon the particular application. For example, among white collar workers without any engineering or other training in electrical or electronic fields, there would probably not be appreciation for any simple means to defeat the device, and hence the device of this degree of sophistication will provide a level of protection sufficient for such applications.

A slightly more sophisticated circuit arrangement is shown in FIGURE 5b wherein the resistive element 65 is coupled in parallel with a diode element 66 such that the resistance across pin 0 and 1 is determined by resistor 65 when a source of a first polarity is coupled across pins 0 and 1, and is determined solely by the internal resistance (usually less than 1 ohm) of diode 66 when the polarity of the source coupled across pins 0 and 1 is reversed. The control device cooperating with the circuit may be designed to require a resistive element of the resistance of element 65 in order to release movable arm 41 while the internal resistance of diode D, which is effectively a short-circuit, will be insufficient to release movable arm 41.

In order to further protect control device 20 against any possible tampering by attempts to bridge between sockets 0 and 1, an internal fuse 70 may be connected in electrical series with winding X, as shown in FIGURE 4. Thus, if the current is of a sufficient magnitude when sockets 0 and 1 are bridged, to harm winding II internal fuse 70 is provided with a characteristic causing it to blow before any harm befalls winding II.

Figure 6:
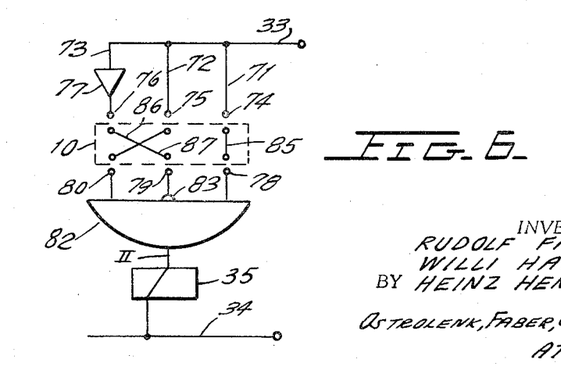
FIGURE 6 is a schematic diagram showing another alternative embodiment for the interlock circuit of FIGURE 3b or FIGURE 4.

FIGURE 6 shows still another alternative arrangement which may be employed in a control device 20 and key-counter device 10. The control device 20 is provided with conductor 33 coupled in common to conductors 71, 72 and 73. Conductors 71 and 72 are electrically connected to sockets 74 and 75, respectively. Conductor 73 is coupled to socket 76 through a logical inverter circuit 77. Control device 20 is further comprised of sockets 78 through 80, respectively, which form inputs to a logical AND gate 82 having an inhibit input terminal 83. The output of AND gate 82 is coupled to one terminal of winding II which has its remaining terminal coupled to conductor 34 in the same manner as is shown in FIGURE 4.

The electronics of key-counter 10 is comprised of three bridging paths 85, 86 and 87. With the key-counter 10 properly plugged into control device 20, bridging path 85 couples conductor 71 to input 78 of AND gate 82. Bridging path 86 couples socket 75 to input socket 80 of AND gate 82. Thus, two inputs of AND gate 82 are enabled, while the third is inhibited to prevent operation of AND gate 82.

However, bridging path 87 couples output socket 76 of inverter 77 to inhibiting socket 79 of AND gate 82. The output level appearing in conductor 33 is inverted by inverter circuit 77. However, the inhibit input 83 of AND gate 82 performs a second inverting operation, causing AND gate 82 to become enabled, and to energize winding II. This arrangement of the key-counter 10 electrical circuit requires additional pins, but is nevertheless an extremely simple arrangement in that the structure requires no active elements or passive elements, and only requires that the appropriate electrical paths be established between pins 74–76 and 78–80 in control device 20. The pins of the counter device 10 may be wired directly, or a minute printed circuit arrangement may be employed, appropriately coupling the pins of key-counter 10 so as to establish the correct electrical paths in the manner shown in FIGURE 6, for example. If it is desired to provide an active circuit within the key-counter device, additional pins may be provided on the key-counter (to be received by additional mating sockets in the control device) to receive suitable bias supplies for the purpose of energizing the active circuit contained within the key-counter.

While the exemplary embodiment described herein has been suggested for use with a copier machine, it should be understood that any other type of machine may be operated by the instant invention. For example, a computer in which it is desired to know the amount of elapsed time each department uses the computer may employ the control device 20 and key-counter 10 of this invention, with the total count of each key-counter respresenting elapsed time of the computer for the associated department, and with the count of control device 20 representing total elapsed time for the computer. If additional departments are added to a company, it is a simple matter to provide an additional key-counter for use by that department. Thus, the arrangement of the instant invention is in no way limited to the number of departments employing any machine so controlled. Since the counter operates as a key, no separate key is needed to operate the machine. Since these key-counters are not in any way readily available through local hardware stores, for example, the only way of defeating the locking feature of the control device is to insure a large expenditure of both time and money to analyze the key-counter device which, when purchased from the authorized source, is a relatively inexpensive device.

It can, therefore, be seen that the instant invention provides a novel key-counter and control device which performs the dual functions of providing straight-forward cost control data for separate departments having access to the machine with each department being provided with its own key-counter and providing electronic means for unlocking the machine (i.e., copier machine, computer, machine tool, etc.) controlled by the control device.

As was previously stated, the versatility of the instant invention resides in the fact that any given number of key-counter devices may be inserted into a control device so long as the key-counter devices each have the appropriate internal electronic element to unlock the control device. In addition, a distinction may be made between different companies renting such devices by providing each company with a different element. For example, different companies may be provided with an impedance element having a different negative temperature coefficient of resistance. In the case where a simple impedance element is employed, each company may be provided with an element having a different value of impedance.

As a further manner for distinguishing between the devices of different companies, the same impedance element may be employed (i.e., having the same resistance or the same negative temperature coefficient of resistance characteristic), but the pins and accompanying socket may be located in a different planar arrangement so as to prevent the insertion of the key-counter allocated to one company from being plugged into the control device allocated to a different company.

As another alternative, the key-counter may be provided with a socket, and the internal panel of the control device may be provided with complementary pins.

If there is any desire to prevent a visually observable reading, the readable counter means window may be sealed or may be substituted by an electronic counter means, for example, which may be read by a suitable reading device (not shown) which may be plugged into the key-counter for the purpose of obtaining a reading. However, the electromechanical counter devices have the advantage of retaining their totals even though a power failure may occur so that no readings are lost.

Whereas the key-counter taught herein is described as being adapted for insertion into the control device, other modifications are possible. For example, the concept of the instant invention may be employed by a truck driver to obtain gasoline at a self-operating service station. This object can be achieved by providing the gas pump with a control device of the type shown in FIGURE 2 and providing the truck driver with a key-counter of the type shown in FIGURES 1a and 1b. In order to prevent any tampering with the key-counter, it is possible to mount the key-counter securely to the automobile dashboard and provide a cable coupled to the key-counter at one end and having plug means for insertion into the control device. This prevents the key-counter from being lost as well as being susceptible to being tampered with.

While the key-counter device taught herein is described for use in applications where it is desired to gain access to a machine, other applications are possible. For example, it may be desired to count the number of voltage changes (i.e., surges) occurring in a particular circuit or network over a given period of time. By adapting the key-counter to be responsive to only voltages of a certain level this function can be readily achieved. As still a further example, it may be desirable to measure the number of slow changes in voltage or current in a circuit and, independently thereof to measure the number of rapid changes or transient changes in a circuit. These objectives may be achieved through the use of two separate key-counters, both being adapted for insertion into the same control device, wherein one key-counter is designed to respond to slow changes while the other key-counter will respond to rapid changes. The devices may also be made to react to changes in magnetic fields, optical phenomena, temperature, or other physical phenomena, as well as being operative by the control of analog-to-digital converters, and the like.

A further modification may be made by providing a timing device T, coupled into the branch circuit of winding II, as shown in FIGURE 4, which timing device becomes operative immediately upon the insertion of a key-counter or any other device which may be inserted to defeat the locking means. It is possible that a person wishing to defeat the locking means may attempt to bridge the socket terminals 0 and shorten by means of a resistive element which has a value sufficient to prevent the fuse 70 from blowing, but which is insufficient to provide for equilibrium between the two windings. In order to defeat such a possibility the timing device T may begin to time out at predetermined time duration for ringing an audio alarm or lighting a visual alarm. If circuit equilibrium is not achieved within the time duration timed out by the timer T, obviously, the time duration is made of a length sufficient to allow the negative temperature coefficient resistor (for example) to reach its final resistive value.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

What is claimed is:

1. Control means for preventing unauthorized use of a machine controlled by electric power comprising a control device positioned adjacent the machine and including first means coupled between the machine and the power source and having a first position disconnecting the machine from the power source;
   second means normally disconnected from the local power source for operating said first means to a second position connecting the machine to the power source;
   said second means including a receptacle of a predetermined configuration;
   third means keyed to be removably inserted into said receptacle to couple said second means to the power source for operating said first means to the second position;
   counter means mounted within said third means and including means mounted in said third means for advancing the count of said counter means, and means mounted in said control device for energizing said advancing means when said machine is energized to measure the productivity of the machine.

2. The device of claim 1, further including fourth means coupled to the local power source and coupled to said first means to maintain said first means in said first position.

3. The device of claim 2 wherein said second means is coupled to counterbalance the operation of said fourth means when said third means is inserted into said receptacle to move said first means to said second position.

4. The device of claim 3 wherein said third means includes an impedance element having an impedance lying within predetermined narrow limits chosen to energize said second means by a value appropriate to operate said first means to said second position.

5. The device of claim 4 wherein said second means provides insufficient counterbalance whenever an impedance element having an impedance value outside of said narrow limits is inserted into said receptacle.

6. The device of claim 5 wherein said impedance element is a resistor.

7. The device of claim 5 wherein said impedance element is a resistor having a negative temperature coefficent of resistance characteristic.

8. The device of claim 5 wherein said impedance element is sealed within a substantially tamper-proof housing to thwart attempts to analyze the element.

9. The device of claim 1 wherein said first means is a switch having a movable contact and at least one stationary cooperating contact;
said second means including a relay having an armature coupled to said movable contact, and a coil; said switch being normally opened when said winding is deenergized;
said third means being a bridging means sealed within a substantially tamper-proof housing; said bridging means coupling said relay coil to the local power source when said housing is inserted into said receptacle to operate said switch means to the closed position.

10. The device of claim 1 wherein said first means is a switch having a movable contact and at least one stationary cooperating contact;
said second means including a relay having an armature coupled to said movable contact, and first and second coils being wound to set up opposing magnetic fields;
said first coil being normally connected to the power source to generate a first magnetic field;
said second coil being normally disconnected from the power source;
said third means being an electrical bridging means sealed within a substantially tamper-proof housing; and bridging means coupling said second coil to the power source when said housing is inserted into said receptacle to generate a second magnetic field substantially cancelling said first magnetic field;
said switch means including bias means coupled to said movable contact for maintaining said switch in the closed position when said first and second coils are energized.

11. The device of claim 10 wherein said electrical bridging means is comprised of an impendance element having a predetermined impedance value lying within narrow limits;
said first coil developing a predetermined value of ampere-turns;
said second coil developing substantially the same value of ampere-turns when an impendance element having an impedance value within said predetermined limits is inserted into said receptacle so as to release said movable contact to the control of said bias means;
said second coil being incapable of developing a sufficient value of ampere-turns capable of releasing said movable contact when an impedance element having an impedance value outside of said narrow limits is inserted in said receptacle.

12. The device of claim 11 wherein said impedance element is a resistor.

13. The device of claim 11 wherein said impedance element is a resistor having a negative temperature coefficient of resistance characteristic.

14. The device of claim 11 wherein said control device is comprised of a second housing having an opening dimensioned to receive one end of said tamper-proof housing;
said receptacle and said one end of said tamper-proof housing having mating coupling for electrically connecting said third means to said control device.

15. The device of claim 14 wherein said tamper-proof housing one end is provided with a plurality of projecting pins arranged in a predetermined planar array;
said receptacle being provided with at least an equal number of sockets arranged to receive one of said associated pins.

16. The device of claim 1 wherein said third means is further comprised of first counter means including means coupled to said conductor means for advancing the count of said counter means;
said control device including means for energizing said advancing means when said machine is energized to measure the productivity of the machine.

17. The device of claim 1 further comprising a second counter means mounted within said control device and including means for advancing the count of said second counter means, said means for energizing said advancing means of said second counter means when said machine is energized to measure the productivity of the machine.

18. The device of claim 9 wherein said third means is further comprised of first counter means including means coupled to said conductor means for advancing the count of said counter means;
said control device including means for energizing said advancing means when said machine is energized to measure the productivity of the machine.

19. The device of claim 10 wherein said third means is further comprised of first counter means including means coupled to said conductor means for advancing the count of said counter means;
said control device including means for energizing said advancing means when said machine is energized to measure the productivity of the machine.

20. The device of claim 19 further comprising a counter means mounted within said control device and including means for advancing the count of said counter means, and means for energizing said advancing means when said machine is energized to measure the productivity of the machine.

21. The device of claim 18 wherein said first counter is mounted within said tamper-proof housing and said second counter is mounted within said control device which is sealed in a second substantially tamper-proof housing.

22. The device of claim 19 wherein said first counter is mounted within said tamper-proof housing and said second counter is mounted within said control device which is sealed in a second substantially tamper-proof housing.

References Cited
UNITED STATES PATENTS 2,934,730   4/1960   Blackwell _____________ 235—92

MAYNARD R. WILBUR, *Primary Examiner.*

GREGORY J. MAIER, *Assistant Examiner.*

U.S. Cl. X.R.

200—42